July 13, 1948. F. A. V. GRAVINESE ET AL 2,445,172
SCREW LOCK FOR EYEGLASSES AND THE LIKE
Filed Dec. 3, 1946 2 Sheets-Sheet 1

July 13, 1948. F. A. V. GRAVINESE ET AL 2,445,172
SCREW LOCK FOR EYEGLASSES AND THE LIKE
Filed Dec. 3, 1946 2 Sheets-Sheet 2

INVENTORS
Frank A. V. Gravinese
Ignatius G. Failla
BY Zoltan Holcheck
ATTORNEY

Patented July 13, 1948

2,445,172

UNITED STATES PATENT OFFICE 2,445,172

SCREW LOCK FOR EYEGLASSES
AND THE LIKE

Frank A. V. Gravinese, Bronx, and Ignatius G.
Failla, Elmhurst, Long Island, N. Y.

Substituted for abandoned application Serial No.
499,052, August 18, 1943. This application December 3, 1946, Serial No. 713,760

3 Claims. (Cl. 151—1)

This invention relates to new and useful improvements in lock means for screws for eyeglasses and other uses.

This is a substitute for our abandoned application, filed on August 18, 1943, Serial Number 499,052.

The invention has for an object to construct a screw lock which is particularly adapted to hold portions of the frames of eyeglasses in position in a manner so as not to become loose. Heretofore screws used in eyeglasses have often worked loose. This necessitates taking the spectacles back to an optician to have the screws retightened and often to have the lenses remounted and realigned.

This invention is broad in its aspects and is intended to include other articles than eyeglasses. Furthermore, the lock means for screws may be used effectively in a large variety of sizes and screws of various shapes.

Particular forms of the invention will be given by way of illustration, but it should be borne in mind that it is readily possible for persons skilled in the art to conceive any number of variations thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view of a pair of eyeglasses with lock means for screws according to this invention.

Fig. 2 is a fragmentary enlarged sectional view taken on the line 2—2 of Fig. 1.

Fig. 3 is a fragmentary sectional view taken on the line 3—3 of Fig. 2.

Fig. 4 is a fragmentary vertical sectional view similar to Fig. 2 but illustrating another form of the invention.

Fig. 5 is a horizontal sectional view taken on the line 5—5 of Fig. 4.

Fig. 6 is another sectional view similar to Fig. 2 but illustrating a further modified form.

Fig. 7 is a horizontal sectional view taken on the line 7—7 of Fig. 6.

Fig. 8 is another vertical sectional view similar to Fig. 2 but illustrating a further modification.

Fig. 9 is a vertical sectional view taken on the line 9—9 of Fig. 8.

Fig. 10 is another vertical sectional view similar to Fig. 2 illustrating a further embodiment of the invention.

Fig. 11 is a bottom elevational view looking in the direction of the line 11—11 of Fig. 10.

Fig. 12 is another sectional view similar to Fig. 2 but illustrating another modification.

Fig. 13 is a fragmentary bottom view looking in the direction of the line 13—13 of Fig. 12.

Fig. 14 is another sectional view similar to Fig. 2 but illustrating another modification.

Fig. 15 is a horizontal sectional view on the line 15—15 of Fig. 14.

Fig. 16 is another sectional view similar to Fig. 2 but illustrating another modification.

Fig. 17 is a bottom elevational view looking in the direction of the line 17—17 of Fig. 16.

Fig. 18 is another sectional view similar to Fig. 2 but illustrating another modification.

Fig. 19 is a vertical sectional view taken on the line 19—19 of Fig. 18.

Fig. 20 is another sectional view similar to Fig. 2 but illustrating another modification.

Fig. 21 is another sectional view similar to Fig. 2 but illustrating another modification.

Figure 22:
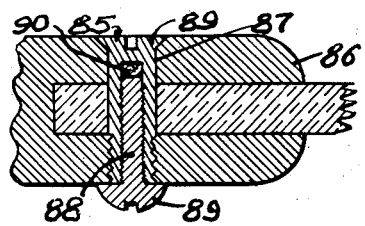
Fig. 22 is another sectional view similar to Fig. 2 but illustrating another modification of the invention.

The lock means for screws for eyeglasses, according to this invention is used in conjunction with a pair of glasses having lenses 10 and a frame consisting of a nose piece 11 and ear brackets 12. Screws 13 engage through portions of the frame and through the lenses for holding the parts as a unit. Each screw 13 has a head portion 13ª, a shank portion 13ᵇ, and a threaded portion 13ᶜ. The lens 10 engages between laminated elements or ears 14 of the frame. The screw 13 engages through aligned apertures in the laminated elements and in the lens 10.

In the form of the invention illustrated in Figs. 1 to 3 a cap nut 15 threadedly engages upon the threaded end of the screw and serves to hold the screw in position. The cap nut portion is formed with an interior slot 16. The end of the screw 13ᶜ is formed with a slot 17. The cap nut or the screw or both, is already charged with fusible material 18 in the respective slots. After the cap nut has been engaged on the screw, heat is applied to produce a fused mass 19 which engages the grooves 16 and 17 for locking the nut and screw together as a unit.

In the form of the invention illustrated in Figs. 4 and 5 a screw 20 engages through laminated portions 21 and has a head 22 at one end and a threaded shank at the other end. A nut 23 threadedly engages the threads of the shank. The shank is also formed with a helical groove 24. Within this groove fusible material 25 is placed, such as lead, and after the screw and nut have been engaged with each other, heat is applied to fuse the material 25, and when hardened serves to lock the parts in fixed positions.

In Figs. 6 and 7 another form of the invention is disclosed in which there are laminated elements 26 through which a screw 27 engages. This screw has a head 28 disposed against the outer face of one of the laminated elements and a threaded shank 29. A slot is formed into the free end and fusible material 30 is engaged in this slot and fused together with the adjacent portions of the assembly to lock the screw in position.

In Figs. 8 and 9 another form of the invention is illustrated in which a screw 31 engages through laminated elements 32. This screw has a head 33 at one end and at its other end is provided with a threaded shank 34. A cap nut 35 threadedly engages the outer end of the screw. The shank of the screw is formed with a slot 36 in which fusible material 37 is engaged. This fusible material may also be placed in the nut cap 35. Heat is applied to fuse the parts together as a unit. This locks the screws in position.

In Figs. 10 and 11 another form of the invention is illustrated in which a screw 38 is engaged through laminated elements 39. This screw has a head 40 at one end and a threaded shank 41 at the other end. A nut 42 threadedly engages upon the shank. This nut is formed with a recess 43 in which fusible material 44 is engaged. This fusible material is fused together with the lower portion of the shank for locking the screw in position.

In Figs. 12 and 13 another form of the invention is disclosed in which there is a screw 45 engaging through laminated elements 46. This screw has a head 47 and a threaded shank portion 48. A nut 49 is threadedly engaged on the screw. The nut has an annular recessed area 50 in which fusible material 51 is engaged. This fusible material is fused together with the adjacent portions of the assembly, to lock the nut and screw together.

In Figs. 14 and 15 another form of the invention is shown in which a screw 52 is engaged through laminated elements 53. This screw has a head 54 at one end and a threaded shank 55 at the other end. A nut 56 engages the threaded shank. Longitudinally of the shank and on diametrically opposite sides the shank is formed with recessed areas 57 in which fusible material 58 is engaged. This fusible material is fused together with the adjacent portions of the assembly for locking the parts together.

In Figs. 16 and 17 another form of the invention is disclosed in which there is a screw 59 engaged through laminated elements 60. This screw has a head 61 at one end and a threaded shank 62 at the other end. A nut 63 threadedly engages the shank. This nut is extra thick so that there is an unused area in the threaded opening thereof. Within this area fusible material 64 is placed and is fused together with the adjacent material of the nut and screw for holding the parts together. This nut 63 is shown with concaved side edges 63ᵃ and other flat sides 63ᵇ merely by way of design. Other shapes and designs of nuts may be used.

In Figs. 18 and 19 a still further modified form of the invention is disclosed in which there is a screw 65 engaged through aligned openings in laminations 66. This screw has a head 67 at one end and a threaded shank 68 at the other end. The shank is formed with several openings 69 extending diametrically thereof. These openings can be made at various angles and are filled with fusible material 70 which becomes fused with the adjacent material when heat is applied for locking the screw in position.

In Fig. 20 a screw 71 is shown engaged through aligned apertures in laminated elements 72. This screw has a head 73 and a threaded shank 74. A nut 75 threadedly engages the shank. Fusible material 76 such as a washer of fusible material is interposed between the nut and an adjacent face of the laminated elements. Heat is applied to fuse the material 76 with the adjacent parts to lock the screw in position.

In Fig. 21 another form of the invention is shown in which there is a screw 77 engaged through aligned openings in laminated elements 78. This screw has a head 79 at one end and a threaded shank 80 at the other end. A cap nut 81 engages a threaded portion of the shank. A washer of fusible material 82 is disposed between the nut and the adjacent face of one of the laminated elements. Heat is applied to fuse the fusible material so as to lock the screw in position.

In Fig. 22 another form of the invention has been shown in which there is a screw 85 engaged through aligned openings in laminated elements 86. The screw 85 consists of a female section 87 and a male section 88 threadedly engaging each other with each section being formed with a head 89 at its outer end. A piece of fusible material 90 is mounted on the base of the female section 87 adjacent the inner end of the male section 88. Heat is applied to fuse the material 90 to lock the sections 87 and 88 of the screw 85 in position.

The heads of the male and female sections may be countersunk as shown in 89 of the female section or not countersunk as shown in 89 of the male section.

The shank of the female section is made in length not to exceed the combined thickness of the several laminated elements when assembled, so that it will not protrude beyond the aperture in the laminated element farthest from its head. If its length is such as not to permit it to be engaged entirely through the aperture in the laminated section farthest from its head the effectiveness of the locking means will not be impaired. It is therefore possible to use a female section of certain specified length not only in assemblies where it can be fully engaged to be flush with the aperture in the laminated element farthest from its head, but also in assemblies of laminated elements somewhat thicker.

It will be noted that this invention does not necessitate changes in the design of the ears or straps of a spectacle assembly. In Fig. 22 the head 89 of the female section 87 is engaged in final assembly within the unthreaded aperture in the upper ear. The free end of the shank of the female section is engaged in final assembly within the normally threaded aperture in the other ear. No change in the conventional design of these two ears, or in the conventional design of a one-ear strap, is necessary for the effective operation of our invention.

Though the outside surface of the free end of the shanks of the female section 87 need not be threaded for the effective operation of this invention, we prefer to thread it so that it will engage threadedly at least a portion of the threaded aperture in the lower ear.

The female section 87 is formed with a threaded cylindrical channel running parallel to its shank and extending from the free end of the shank to a point below the head of the female section, as shown in Fig. 22. A piece of soft fusible material 90 preferably solder is disposed frictionally in the inner base of the female section 87. This fusible material may be positioned in said fashion either when the female section 87 is manufactured or when the spectacles are assembled. Though we prefer to perform this operation when the female section is manufactured, the positioning of the fusible material during assembly of the spectacles will be relatively simple on those occasions when our invention is re-used and the original fusible material has been dissipated in the dismounting process.

The shank of the male section 88 is threaded so that it can be threadedly engaged within the threaded channel of the female section 87. Since the combined thickness of the laminated elements varies often due to the greater thickness of certain lenses, the free end of the threaded shank of the male section 88 will not always contact the fusible material 90 before application of heat as illustrated in Fig. 22. However it is preferable to make the male section 88 in a small variety of lengths, so that excessive free space will not be left between the tip of its threaded end and the fusible material. Said free space would not render the invention ineffective as the fusible material will flow downward onto the tip and threads of the male section when heat is applied. However when said free space is kept moderately small, the expansive force of the fusible material when heated will be added to the force of gravity in forcing the fusible material down onto the tip of the male section and between the threads of the male section and the threads of the channel in the female section.

It is understood that the surface of the shank and threading of the male section 88 and the surface and threading of the cylindrical channel in the female section 87 may be treated with flux prior to assembly in order to remove grease and other foreign matter which would impair the adhering effectiveness of the fusible material.

The operational steps in the use of our invention are as follows:

When the laminated elements are brought into proper alignment, the female section 87 is inserted through the unthreaded apertures and then threadedly engaged into the threaded aperture of the remaining laminated element, until the desired tension is obtained. The male section 88 is then threadedly engaged into the threaded cylindrical channel in the female section 87. Heat is then applied electrically by a process already used in the art in order to melt the fusible material 90. The molten fusible material, due to its expansive force when melting and to the pull of gravity, is formed downward to the tip of the male section 88 and part of it is forced between the threads of the male section and the threads of the cylindrical channel in the female section. When the source of heat is removed, the fusible material cools and hardens and in this process it adheres firmly to portions of the surface of the male section 88 and portions of the surface of the cylindrical channel in the female section 87. This adhering force plus the cohering force of the fusible material when hardened, locks the screw in position.

Though, as formerly stated, we prefer to thread the outer surface of the free end of the shank of the female section 87, this need not be threaded. If it is not threaded the female section 87 is merely inserted through the aligned apertures in the laminated elements and then the male section 88 is threadedly engaged into the threaded cylindrical channel in the female section 87 until the desired tension is obtained.

In either case the desired tension is obtained by means of threaded engagement of our invention with one of the laminated elements in the assembly or by threaded engagement of the male section to the female section. In the assembly of spectacles the screw which forms the locking means should not be tightened excessively since excessive tightening will interfere with the necessary free play of the lens and may result in breakage. While male-female assemblies of telescoping members are used in the art, in combination with fusible materials as a locking means, the telescoping members are not threadedly engaged with each other or with any element of the spectacle assembly. In the operation of these male-female assemblies already known to the art, the laminated elements must be clamped at the desired tension during the insertion and locking of the unthreaded telescoping members. One novel feature of our invention is that the laminated elements are held at operational tension by threaded engagement.

The male-female telescoping elements already used in the art are not threadedly engaged to each other, nor to any portion of the spectacle assembly. In one variation the telescoping members are smooth-surfaced and tinned with fusible material. In other variations the surface of the male member is roughened or grooved or notched to provide anchoring with the fusible material. In other variations the surface of the cylindrical channel inside the female member is roughened or grooved to provide anchoring with the fusible material. In another variation the male member consists of a threaded screw, smaller than the cylindrical channel in the female member, said threaded screw carrying fusible material on its surface. The threading on this screw does not engage or contact the surface of the cylindrical channel in the female member, but merely fulfills the purpose of first carrying and then anchoring the fusible material. In another variation the male and/or female members are formed with recesses charged with fusible material, but either member is threaded.

All these male-female locking means already known to the art depend solely on the adhering or anchoring of fusible material to provide the holding or locking action. None of them utilizes the normal holding action of threaded engagement. If the holding action of the fusible material should fail, the entire assembly can loosen or come apart.

It is believed that applicants' invention of a threaded male-female assembly combined with the adhering force of solder is novel. This invention combines the adhering action of fusible material and the holding action of the male and female members threadedly engaging each other and the holding action of the female member threadedly engaging one of the laminated elements.

It is also believed that applicants' invention is novel and that it is the only male-female assembly yet presented whereby the laminated elements are brought to the exact desired operational tension, which is of vital importance in spectacle assembly by means of threaded engagement rather than clamping.

It is also believed that applicants' invention is novel in that it is the only male-female assembly yet presented whereby it can be used, if need be, without fusing the solder if for instance, the electric heating machine which provides the source of heat is out of order, or if it is desired that the spectacles be worn for a short period of time to test their operational effectiveness without its being necessary, for such short period of time, to use the locking means provided by fusing the solder.

Figure 23:
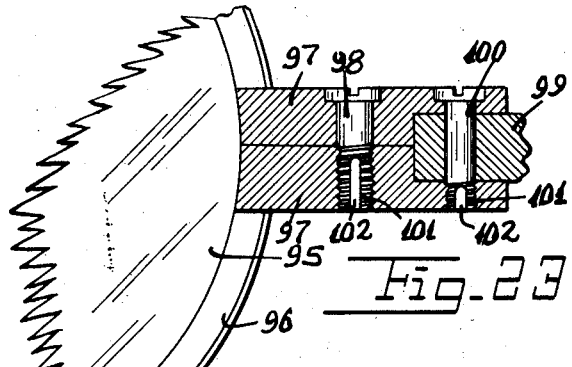
Fig. 23 is a vertical sectional view of a portion of a pair of eyeglasses illustrating a method of attaching a temple to the side thereof, and of securing the eye wire in position.

In Fig. 23 an eyeglass 95 is illustrated in position in a frame 96 having a pair of adjacent laminated elements 97. A screw 98 connects the laminated elements 97 together for drawing the frame 96 in position about the eyeglass 95.

A temple 99 is inserted in position between the ends of the laminated elements 97 and is retained in position by screw 100 as to be capable of pivoting relative to the laminated elements 97.

The screws 98 and 100 each have a groove 101 inserted inwards from their bottom ends in which fusible material 102 is mounted. When this fusible material 102 is melted it will contact the adjacent portions of the assembly to securely lock the screws 98 and 100 in position.

Figure 24:
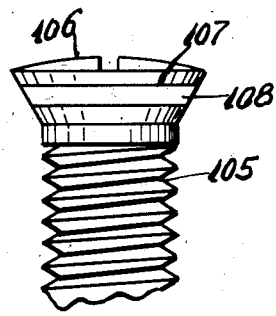
Fig. 24 is an elevational view of a screw constructed in accordance with a modification of the invention.
Figure 25:
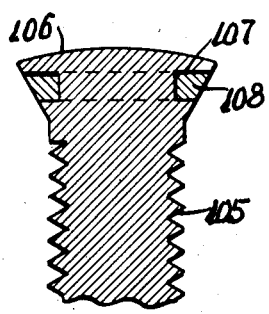
Fig. 25 is a sectional view of the top portion of Fig. 24.

In Figs. 24 and 25 a screw 105 is illustrated which has a head 106 which is adapted to be counter-sunk. This head is formed with a groove 107 which completely encircles the head 106. Fusible material is mounted in this groove to be melted to contact the surface of the material into which the head is counter-sunk for locking the screw 105 in position.

Figure 27:
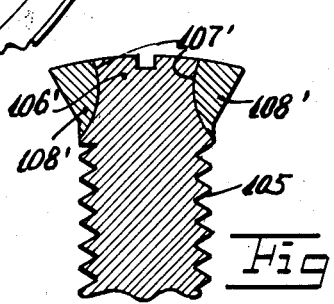
Fig. 27 is a sectional view of the top portion of Fig. 26.
Figure 26:
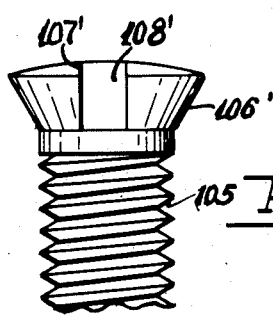
Fig. 26 is a view similar to Fig. 24 but illustrating a still further modification of the invention.

In Figs. 26 and 27 the head 106' of the screw 105 is formed with recesses 107' in its diametrically opposite sides in which the fusible material 108' is located. In other respects this form of the invention is similar to that shown in Figs. 24 and 25.

Figure 28:
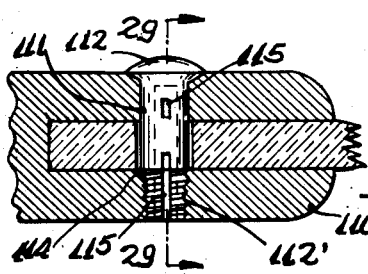
Fig. 28 is another view similar to Fig. 2 but illustrating another modification of the invention.
Figure 29:
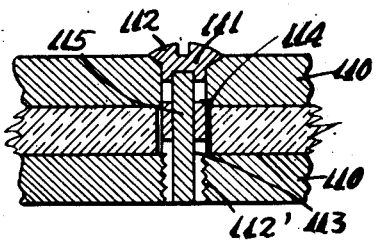
Fig. 29 is a sectional view on the line 29—29 of Fig. 28.

In Figs. 28 and 29 another form of the invention is disclosed in which there are laminated elements 110 through which a screw 111 engages. The screw has a head 112 counter-sunk into the outer face of one of the laminated elements 110 and a threaded shank portion 112' engaging the other laminated element 110.

A recess 113 is extended inwards from one end of the screw 111 and is formed with a plurality of laterally extending branch holes 114 extending to the sides of the screw. The recess 113 and the branch holes 114 are charged with fusible material 115. The fusible material 115 is adapted to be melted to contact the adjacent portions of the assembly for locking the screw 111 in position.

It is to be understood that the recess 113 may be varied in size and shape and the branch holes 114 may be distributed in various positions about the circumference of the screw shank and may be varied in size or shape.

It is to be understood that the portions of the screw and nuts may be tinned as desired, and that the fusible material may be applied thereto at the time the parts of the lock means are manufactured or when the lock means is being used to connect together the parts of a pair of spectacles as described.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new, and desire to secure by United States Letters Patent is:

1. A device of the class described having a screw upon the end of which a cap nut is engageable, fusible material in said cap nut between the inner end of said screw and the base wall of said cap nut, and means in the adjacent end of said screw and base wall of said cap nut engageable by the fusible material for locking the cap nut and screw together as a unit.

2. A device of the class described having a screw upon the end of which a cap nut is engageable, fusible material in said cap nut between the inner end of said screw and the base wall of said cap nut, and means in the adjacent end of said screw and base wall of said cap nut engageable by the fusible material for locking the cap nut and screw together as a unit, comprising slots formed in the end of said screw and the base wall of said cap nut into which the fusible material will enter when softened to connect the nut and screw together when the fusible material again hardens.

3. A lock means for eyeglasses and other uses, comprising several laminated elements of an eyeglass or other object, a screw engaging through aligned apertures in said laminated elements, said screw being formed in two sections comprising a male-female assembly, said male section engaging threadedly into said female section, and fusible material disposed frictionally in inner base of said female section.

FRANK A. V. GRAVINESE.
IGNATIUS G. FAILLA.